United States Patent [19]

Feria

[11] Patent Number: 4,822,109

[45] Date of Patent: Apr. 18, 1989

[54] VEHICLE WHEEL RETENTION CAP

[75] Inventor: Juan M. Feria, Diadema S. Paulo, Brazil

[73] Assignee: Autometal S/A, S. Paulo, Brazil

[21] Appl. No.: 5,260

[22] Filed: Jan. 20, 1987

[51] Int. Cl.$^4$ .............................................. B60B 7/06
[52] U.S. Cl. ................. 301/37 P; 301/37 C; 301/37 TP
[58] Field of Search ............... 301/37 R, 37 P, 37 TP, 301/37 PB, 37 C, 108 R, 108 A

[56] References Cited

U.S. PATENT DOCUMENTS

| | | | |
|---|---|---|---|
| 3,747,984 | 7/1973 | Andrens et al. | 301/37 P |
| 4,361,359 | 11/1982 | Binnewies | 301/37 P X |
| 4,366,992 | 1/1983 | Enke | 301/37 P |
| 4,457,559 | 7/1984 | Rene | 301/37 R X |
| 4,512,614 | 4/1985 | Loper | 301/37 P |
| 4,596,425 | 6/1986 | Hung | 301/37 P |
| 4,645,269 | 2/1987 | Brown et al. | 301/37 P |
| 4,709,967 | 12/1987 | Sakamoto | 301/37 R X |

FOREIGN PATENT DOCUMENTS

| | | | |
|---|---|---|---|
| 0149935 | 7/1985 | European Pat. Off. | 301/37 P |
| 0187228 | 7/1986 | European Pat. Off. | 301/37 P |
| 3016619 | 11/1981 | Fed. Rep. of Germany | 301/37 P |

Primary Examiner—Robert B. Reeves
Assistant Examiner—Russell D. Stormer
Attorney, Agent, or Firm—Michael J. Striker

[57] ABSTRACT

A vehicle wheel retention cap includes a cup-shaped body made of plastic, a plurality of grooved projections on the internal face of the cap body for receiving a metallic ring, and a plurality of clamps injected at the internal face of the cap and formed of heat-resistant plastic which can be colored. The clamps which are engageable in the vehicle wheel have recesses which also receive the metallic ring.

6 Claims, 2 Drawing Sheets

A

VEHICLE WHEEL RETENTION CAP

BACKGROUND OF THE INVENTION

The present invention relates to a retention cap for a wheel of a motor vehicle.

Retention caps for vehicle wheels of the type under discussion are normally perforated or provided with projections for fixing the cap on the wheel. Such caps are normally made of plastic material and can be colored or coated with adhesives or the like.

Such caps should be resistant to heat since they are subject to friction Conventional caps, however are quite expensive in manufacture because of high costs of the material and application of various tints.

SUMMARY OF THE INVENTION

It is an object of the present invention to provide an improved retention cap for a vehicle wheel.

It is another object of the invention to provide a retention cap which is inexpensive to make as compared to conventional caps of the foregoing type.

These and other objects of the invention are attained by a retention cap for a wheel of a vehicle, the cap comprising a body made of plastic and having an internal face; a plurality of projections formed on said internal face and of the same plastic as said body, said projections being circumferentially spaced from each other and extending normally to said internal face towards a center of said body, said projections having grooves; a metallic ring; and a plurality of clamps provided at said internal face between said projections and extending towards the center of said body, said clamps being engageable in a wheel and formed of a heat resistant plastic different of that of said body and having extensions forming recesses in said clamps, said metallic ring being received in said grooves and said recesses.

Said extensions may be curved to engage said ring received in said recesses.

Base portions may be formed on said internal face, said clamps being injected into said base portions.

The base portions may be each formed by two parallel projections spaced from each other to receive therebetween a portion of a respective clamp injected thereinto.

The clamps may be made of a color different from that of said body.

The grooves and the recesses may open in opposite directions.

In the retention cap of the present invention the cap is comprised of the body portion formed of any inexpensive plastic and injected clamps made of more expensive heat-resistant plastic.

It is thus possible to make retention caps by providing a body of plastic mass with fragments injected therein, which fragments can be colored as desired. Thus during repair these fragments can be replaced only, instead of substitution of the entire cap.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 1:
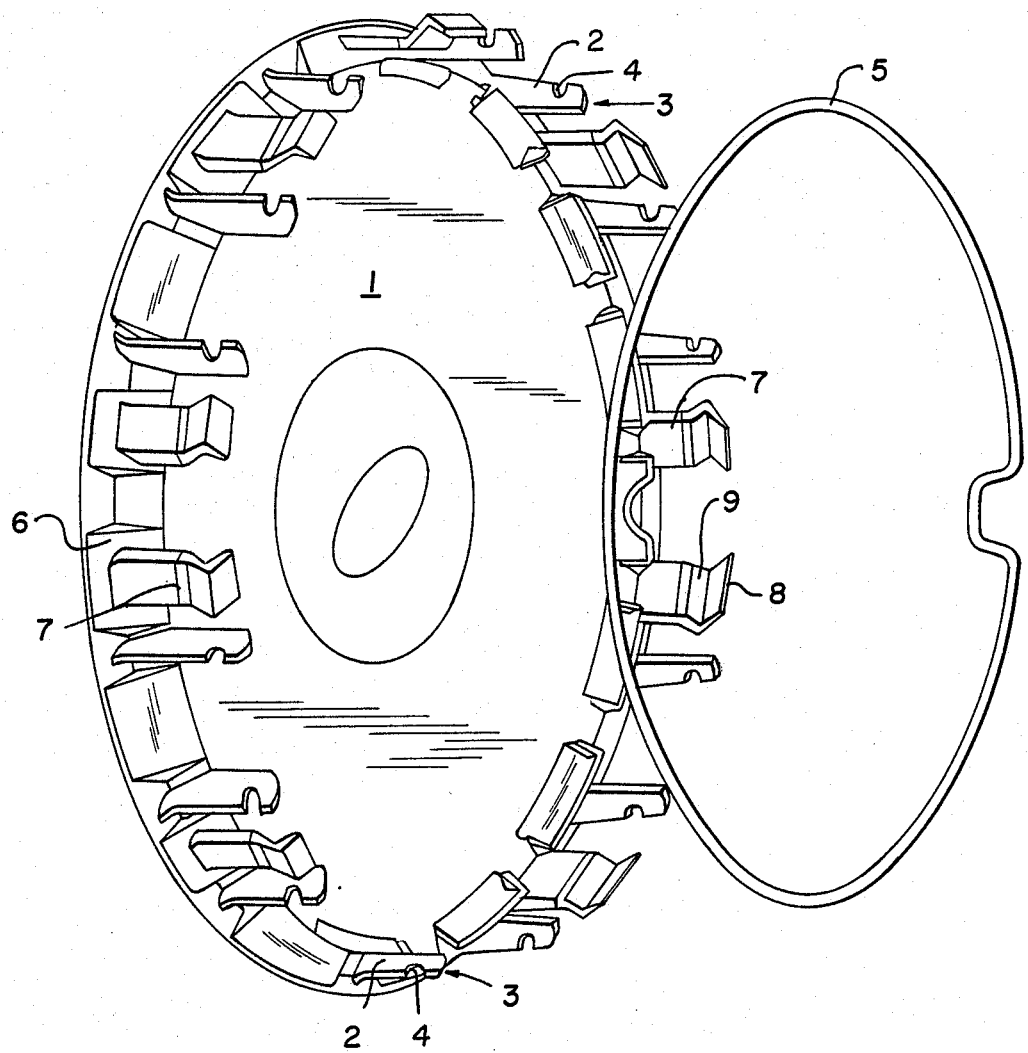
FIG. 1 is an exploded perspective view of the retention cap and the ring to be clamped therein, according to the invention.
Figure 2:
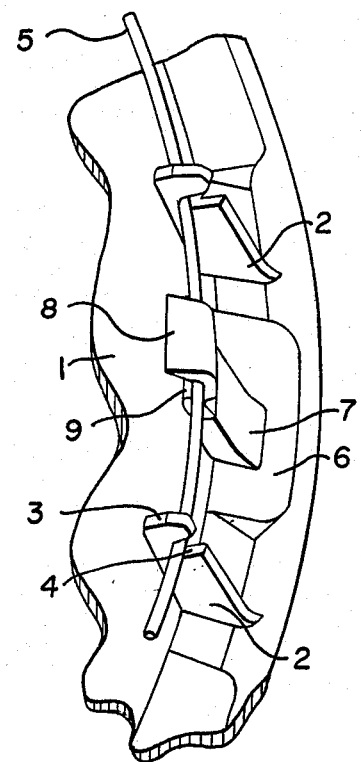
FIG. 2 is a partial perspective view of the assembled cap.

Referring now to the drawings in detail it will be seen that reference numeral I designates a retention cap of a wheel of a motor vehicle. Cap 1 has a cup-shaped body portion made of plastic by injection molding or any other suitable process and which may be colored or non-colored. Cap 1 is provided at the interior face thereof which in assembly faces a wheel, designated by reference numeral II and shown in FIG. 3, with a plurality of spaced projections 2, formed of the same material than that of the ring-shaped portion of cap 1, and all having side grooves 4 which receive a metallic ring 5, as shown in FIG. 2. Projections 2 extend normal to the face of the cap. Reference numeral 3 denotes a top portion of each projection 2.

According to the invention in addition to projections 2, clamps 7 are formed, for example by injection molding on base portions 6 provided on the internal wall of the cap 1. Clamps 7 are made of thermoresistant plastic which is colored. Clamps 7 substantially alternate with projections 2 along the periphery of the cap and are formed with curved extremities or extended portions 8 each provided with a recess 9. Extended portions 8 as well as projections 2 project towards the center of the cap 1 and are spaced from adjacent projections 2. As clearly shown in FIG. 2 recesses 9 receive the metallic ring 5 which is reliably clamped in grooves 4 which open away from the center of the cap and also in recesses 9 which open towards the center of the cap.

Figure 3:
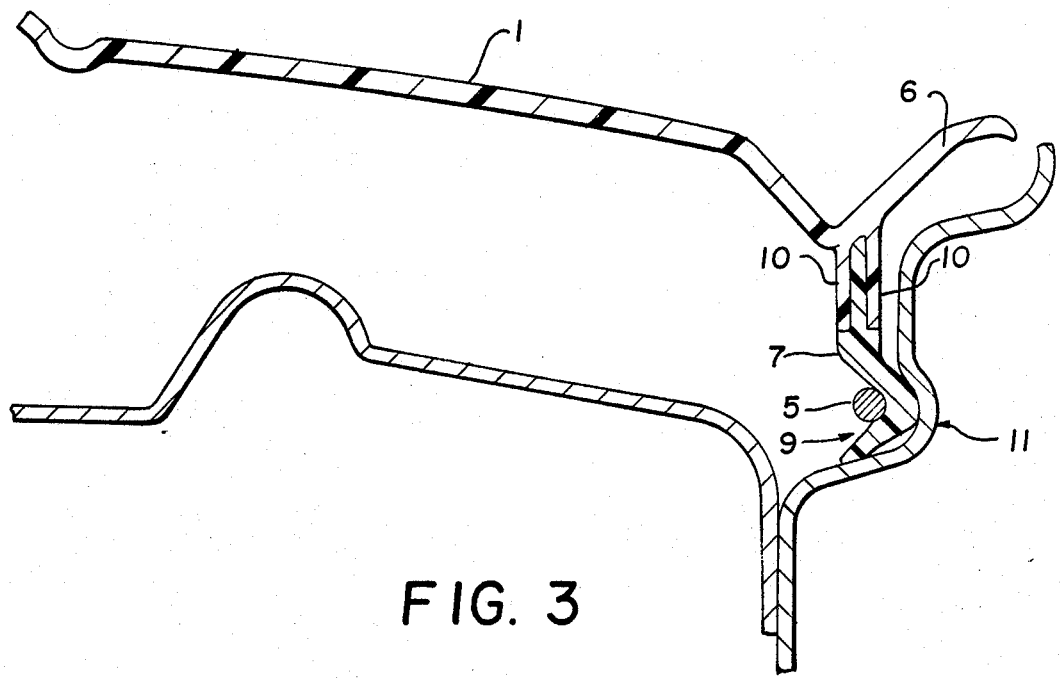
FIG. 3 is a partial sectional view of the retention cap in conjunction with a wheel shown in portion.

With reference to FIG. 3 it is seen that in the region of each base portion 6, the cap is provided with two parallel extended portions or projections 10 which form therebetween a space into which the clamp 7 is injected. In assembly, extended portions 8 of the clamps 7 abut against the face of wheel 11.

The chief advantage of the present invention resides in that the provision of clamps 7, which are preferably made of colored thermo-resistant plastic, substantially reduces costs of the cap because the cap is formed as a receptor of fragments of colored mass while the remaining part of the cap can be made of inexpensive plastic.

It will be understood that each of the elements described above, or two or more together, may also find a useful application in other types of wheel retention caps differing from the types described above.

While the invention has been illustrated and described as embodied in a vehicle wheel retention cap, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A retention cap for a wheel of a vehicle, the cap comprising a body made of plastic and having an internal face; a plurality of projections formed on said internal face and of the same plastic as said body, said projections being circumferentially spaced from each other and extending normally to said internal face towards a center of said body, said projections having grooves; a metallic ring; and a plurality of clamps injection molded onto said internal face between said projections and extending towards the center of said body, said clamps being engageable in a wheel and formed of a heat-resistant plastic and having extensions forming recesses in said clamps, said metallic ring being received in said grooves and said recesses, said plastic of said body and said projections being different from said heat-resistant plastic of said clamps.

2. The cap as defined in claim 1, wherein said extensions are curved to engage said ring received in said recesses.

3. The cap as defined in claim 1, wherein base portions are formed on said internal face, said clamps being injected into said base portions.

4. The cap as defined in claim 3, wherein said base portions are each formed by two parallel projections spaced from each other to receive therebetween a portion of a respective clamp injected therein.

5. The cap as defined in claim 1, wherein said clamps are of a color different from that of said body.

6. The cap as defined in claim 1, wherein said grooves and said recesses open in opposite directions.

* * * * *